United States Patent
Asano et al.

(10) Patent No.: US 6,867,894 B2
(45) Date of Patent: Mar. 15, 2005

(54) ELECTROCHROMIC MIRROR

(75) Inventors: Tsuyoshi Asano, Yokohama (JP); Keizo Ikai, Yokohama (JP); Yoshinori Nishikitani, Yokohama (JP)

(73) Assignees: Nippon Oil Corporation, Tokyo (JP); Kabushiki Kaisha Honda Lock, Miyazaki (JP)

( * ) Notice: Subject to any disclaimer, the term of this patent is extended or adjusted under 35 U.S.C. 154(b) by 0 days.

(21) Appl. No.: 10/376,033

(22) Filed: Feb. 27, 2003

(65) Prior Publication Data

US 2003/0161025 A1 Aug. 28, 2003

Related U.S. Application Data

(63) Continuation of application No. PCT/JP01/06745, filed on Aug. 6, 2001.

(30) Foreign Application Priority Data

Sep. 1, 2000 (JP) .......................................... 2000-265257

(51) Int. Cl.$^7$ .................................................. G02F 1/153
(52) U.S. Cl. ...................... 359/272; 359/274; 359/267; 359/273; 252/583; 546/257; 544/347
(58) Field of Search ................................ 359/265–275; 252/583, 600; 544/347; 546/257; 204/290.07

(56) References Cited

U.S. PATENT DOCUMENTS

| | | | |
|---|---|---|---|
| 3,742,600 A | | 7/1973 | Lowell |
| 3,744,126 A | | 7/1973 | Forlini et al. |
| 4,902,108 A | * | 2/1990 | Byker .......................... 359/265 |
| 5,724,187 A | * | 3/1998 | Varaprasad et al. .......... 359/608 |
| 5,910,854 A | | 6/1999 | Varaprasad et al. |
| 6,519,072 B2 | * | 2/2003 | Nishikitani et al. .......... 359/272 |
| 2003/0184839 A1 | * | 10/2003 | Nishikitani et al. .......... 359/265 |

FOREIGN PATENT DOCUMENTS

| | | |
|---|---|---|
| EP | 0 612 826 A1 | 8/1994 |
| JP | 48-23452 A | 3/1973 |
| JP | 07-070218 A | 3/1995 |
| WO | WO 98/42796 A1 | 10/1998 |

* cited by examiner

*Primary Examiner*—Evelyn A. Lester
(74) *Attorney, Agent, or Firm*—Akin Gump Strauss Haver & Feld, LLP

(57) ABSTRACT

A conventional electrochromic mirror comprises an ion conductive layer provided between a transparent electrically conductive substrate and a reflective electrically conductive substrate and containing spacers. The spacers can be perceived when the mirror was viewed. According to the present invention, the difference in refraction index between the spacers and the ion conductive layer is ±0.03 or less. Therefore, the electrochromic mirror having spacers in the ion conductive layer which are hardly perceived can be provided.

2 Claims, 2 Drawing Sheets

ELECTROCHROMIC MIRROR

CROSS-REFERENCE TO RELATED APPLICATION

This application is a continuation of International Application No. PCT/JP01/06745, filed Aug. 6, 2001, the disclosure of which is incorporated herein by reference.

FIELD OF THE INVENTION

This invention relates to electrochromic mirrors (hereinafter referred to as "EC mirrors") which are useful as antiglare mirrors for automobiles, decorative mirrors, and displays.

BACKGROUND OF THE INVENTION

EC mirrors for automobiles are those which vitiate the effect of headlamp glare from vehicles travelling in the rear by changing reversibly the reflectance with respect to incoming electromagnetic radiation therefrom with electrochromic means. In recent years, the demand of such EC mirrors drastically increased and the production thereof around the world in 1997 reached 4,200,000.

Needless to mention, an EC mirror is required to have a feature to vitiate headlamp glare from vehicles in the rear but is now also required to be lightened and increased in durability.

The major weight of an EC mirror is occupied by that of the glass sheets and it is thus the most suitable manner to thin the glass sheets so as to lighten the EC mirror. However, the thinning of the glass sheets would arise a necessity to place spacers in the cell so as to maintain the cell gap constant. Due to the wider cell gap of an EC cell compared with that of a general liquid crystal cell, the spacers arranged in the former cell gap are irritatingly perceived by the driver when he or she sees the mirror containing the spacers in the cell.

In view of the foregoing, the present invention was made and has an object to provide an electrochromic mirror whose spacers are hardly perceived and thus do not bother the driver's view.

DISCLOSURES OF THE INVENTION

In order to achieve the aforesaid object, there is provided an electrochromic mirror in which an ion conductive layer is arranged between a transparent electrically conductive substrate and a reflective electrically conductive substrate wherein spacers are dispersed in the ion conductive layer and the difference in refraction index between the spacers and the ion conductive layer is ±0.03 or less.

The ion conductive layer preferably exhibits electrochromic properties.

The ion conductive layer preferably contains an electrochromic compound.

The electrochromic compound comprises preferably at leas a cathodic electrochromic compound and an anodic electrochromic compound.

The electrochromic compound is preferably an organic compound having a structure with cathodic electrochromic properties and a structure with anodic electrochromic properties in combination.

DETAILED DESCRIPTION OF THE INVENTION

Figure 1:
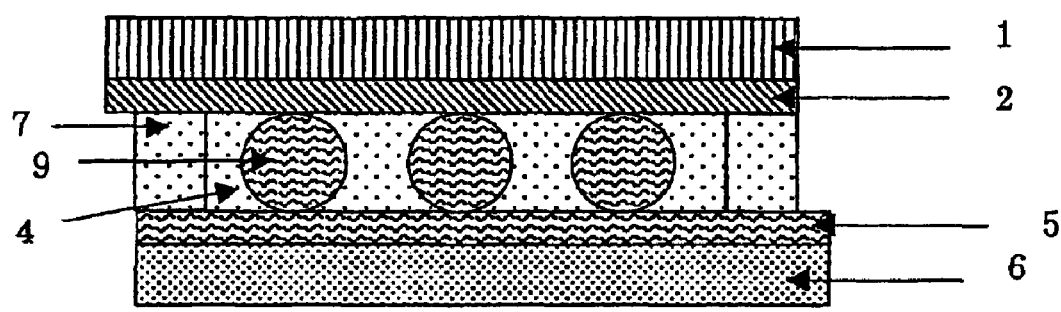
FIG. 1 is a cross-sectional view showing one example of the electrochromic mirror according the present invention.

Two electrically conductive substrates are used in an EC mirror according to the present invention. The term "electrically conductive substrate" refers to a substrate functioning as an electrode. Therefore, the electrically conductive substrates used herein encompass those made from electrically conductive materials and those obtained by laminating an electrically conductive layer over one or both surfaces of a non-electrically conductive substrate. Regardless of whether the substrate is electrically conductive or not, it has preferably a smooth surface at normal temperatures. The surface, however, may be flat or one-, two-, or third-dimensionally curved and deformable under stress as well.

One of the two substrates used in the present invention is a transparent electrically conductive substrate and the other is a reflective electrically conductive substrate.

The transparent electrically conductive substrate may be produced by laminating a transparent electrode layer over a transparent substrate. The term "transparent" used herein denotes a photo transmittance of from 10 to 100 percent in the visible light region.

No particular limitation is imposed on the material of the transparent substrate, which, therefore, may be color or colorless glasses, tempered glasses or color or colorless transparent resins. Specific examples of such resins are polyethylene terephthalate, polyethylene naphthalate, polyamide, polysulfone, polyether sulfone, polyether etherketone, polyphenylene sulfide, polycarbonate, polyimide, polymethyl methacrylate, and polystyrene.

The transparent electrode layer may be made of a metal thin film of gold, silver, chrome, copper, and tungsten or an electrically conductive thin film of metal oxides. Specific examples of the metal oxides are ITO ($In_2O_3$—$SnO_2$), tin oxide, silver oxide, zinc oxide, and vanadium oxide. The film thickness is usually within the range of 10 to 1,000 nm and preferably 50 to 300 nm. The surface resistance of the film is within the range of usually 1 to 100 $\Omega$/sq. and preferably 3 to 30 $\Omega$/sq. Any suitable method of forming a transparent electrode layer may be employed depending on the type of metals and/or metal oxides forming the electrode. The transparent electrode layer may be formed by vacuum deposition, ion-plating, sputtering, and sol-gel methods.

Eligible reflective electrically conductive substrates for the present invention are (1) laminates obtained by laminating a reflective electrode layer over a non-electrically conductive transparent or opaque substrate, (2) laminates obtained by laminating a transparent electrode layer over one surface of a non-electrically conductive transparent substrate and a reflective layer over the other surface thereof, (3) laminates obtained by laminating a reflective layer over a non-electrically conductive transparent substrate and a transparent electrode layer over the reflective layer, (4) laminates obtained by laminating a transparent electrode layer over a reflective plate used as a substrate, and (5) plate-like substrates which themselves have functions as a photo-reflective layer and an electrode layer.

The term "reflective electrode layer" denotes a thin film which has a mirror surface and is electrochemically stable in performance as an electrode. Specific examples of such a thin film are a metal film of gold, platinum, tungsten, tantalum, rhenium, osmium, iridium, silver, nickel, palladium, or chrom and an alloy film of platinum-palladium, platinum-rhodium or stainless. Any suitable method of forming such a thin film may be employed such as vacuum deposition, ion-plating, and sputtering methods.

The substrate to be provided with a reflective electrode layer may be transparent or opaque. Therefore, the substrate may be the above-described transparent substrate and various plastics, glasses, woods and stones which may not be transparent.

The term "reflective plate" or "reflective layer" denotes a substrate having a mirror surface or a thin film which may be a plate or thin film of silver, chrome, aluminum, stainless, or nickel-chrome.

If the above described reflective electrode layer per se is rigid, the use of a substrate may be omitted.

Alternatively, in the present invention, an additional electrode layer formed with a material having a resistance which is lower than the surface resistance of the electrically conductive layer may be provided on peripheries thereof. The additional electrode layer may be provided entirely or partially over the entire peripheries of the electrically conductive substrate.

No particular limitation is imposed on the additional electrode layer as long as it provides a higher electrical conductivity than the electrically conductive substrate. Therefore, it may be made of an electrically conductive film made of a metal such as gold, silver, chrome, copper, and tungsten or that made of an electrically conductive paste obtained by dispersing such a metal in a resin. No particular limitation is imposed on the width, thickness, and surface resistance of the electrode layer as long as it has a lower surface resistance than that of the electrically conductive substrates to be used. The width is in the range of generally 0.05 to 100 mm, preferably 0.1 to 20 mm, and more preferably 0.5 to 2 mm. The thickness is in the range of 0.2 to 500 $\mu$m, preferably 0.5 to 100 $\mu$m, and more preferably 1 to 20 $\mu$m. The surface resistance (resistivity) is generally $\frac{1}{5}$ or less and preferably $\frac{1}{10}$ or less of that of the conductive layer of the electrically conductive substrate. Any suitable known method may be employed to form the electrode layer. It is preferred to employ the method depending on the material forming the electrode. When forming the electrode with the above-mentioned metal, there may be employed various methods such as vacuum deposition, ion-plating, and sputtering methods. When the electrode layer is formed with the electrically conductive paste obtained by dispersing any of the above-exemplified metals in a resin, there may be employed screen-printing or dispenser method.

The ion conductive layer of the mirror of the present invention exhibits an ion conductivity of $1 \times 10^{-7}$ S/cm or higher, preferably $1 \times 10^{-6}$ S/cm or higher, and more preferably $1 \times 10^{-5}$ S/cm or higher at room temperature.

The thickness of the ion conductive layer is generally 1 $\mu$m or more and preferably 10 $\mu$m or more and 3 mm or less and preferably 1 mm or less.

The ion conductive layer used in the present invention preferably exhibits electrochromic properties and thus usually contains an electrochromic compound. Alternatively, an electrochromic layer may be arranged separately in the electrochromic mirror. No particular limitation is imposed on the electrochromic compound as long as it can perform the functions as an electrochromic mirror. Examples of the electrochromic compounds are anodic electrochromic compounds, cathodic electrochromic compounds, and compounds having a cathodic electrochromic structure and an anodic electrochromic structure in combination.

No particular limitation is imposed on the cathodic electrochromic compound as long as it involves an increase in absorption spectrum caused by an electrochemical reduction reaction. Examples of the cathodic electrochromic compound are those exhibiting a reversible oxidation reduction reactivity, such as styryl compound derivatives, viologen compound derivatives, and anthraquinone-based compound derivatives. No particular limitation is imposed on the anodic electrochromic compound as long as it involves an increase in absorption spectrum caused by an electrochemical oxidation reaction. Examples of the anodic electrochromic compound are those exhibiting a reversible oxidation reduction reactivity, such as pyrazoline-based compound derivatives, metallocene compound derivatives, phenylenediamine compound derivatives, phenazine-based compounds, phenoxadine compound derivatives, phenothiazine compound derivatives, and tetrathiafulvalene derivatives.

Alternatively, there may be used an organic compound having both a structure exhibiting cathodic electrochromic properties and a structure exhibiting anodic electrochromic properties. In such an organic compound, the number of a structure exhibiting cathodic electrochromic properties and a structure exhibiting anodic electrochromic properties is preferably 2 or less in per molecule, respectively. This preferred compound preferably comprises one or more organic compounds selected from the group consisting of those having one cathodic electrochromic properties-exhibiting structure and one anodic electrochromic properties-exhibiting structure per molecule, those having one cathodic electrochromic properties-exhibiting structure and two anodic electrochromic properties-exhibiting structures per molecule, those having two cathodic electrochromic properties-exhibiting structures and one anodic electrochromic properties-exhibiting structure per molecule, and those having two cathodic electrochromic properties-exhibiting structures and two anodic electrochromic properties-exhibiting structures per molecule.

The term "cathodic electrochromic properties-exhibiting structure" used herein denotes either viologen compound derivative structure or anthraquinone-based compound derivative structure. The term "anodic electrochromic properties-exhibiting structure" used herein denotes either one of pyrazoline-based compound derivative structure, metallocene compound derivative structure, phenylenediamine compound derivative structure, benzidine compound derivative structure, phenazine compound derivative structure, phenoxadine compound derivative structure, phenothiazine compound derivative structure, or tetrathiafulvalene derivative structure.

In the present invention, a compound acting as an electrochromic active material (hereinafter referred to as Compound (A)) contains a bipyridinium ion-pair structure represented by formula (1) given below and a metallocene structure represented by formula (2) or (3) given below:

(1)

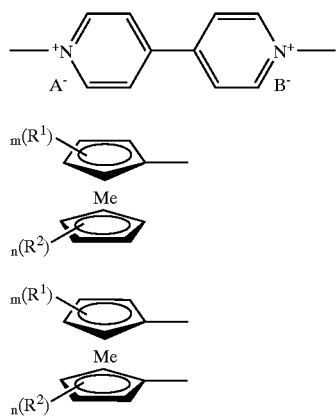

(2)

(3)

In formula (1), $A^-0$ and $B^-$ may be the same or different and are each independently a pair-anion selected from the group consisting of a halogen anion, $ClO_4^-$, $BF_4^-$, $PF_6^-$, $CHCOO^-$, and $CH_3(C_6H_4)SO_3^-$. Examples of of the halogen anion are $F^-$, $Cl^-$, $Br^-$, and $I^-$.

In formulae (2) and (3), $R^1$ and $R^2$ may be the same or different and are each independently a hydrocarbon groups selected from the group consisting of alkyl, alkenyl, and aryl groups having 1 to 10 carbon atoms. Examples of the alkyl group are methyl, ethyl, i-propyl, n-propyl, n-butyl, t-butyl, n-pentyl, n-hexyl, and cyclohexyl groups. Particularly preferred are methyl, ethyl, and propyl groups. The aryl group is exemplified by phenyl group.

$R^1$ or $R^2$ may form a condensed ring by bonding to a cyclopentadienyl ring or may individually form a group cross-linking a cyclopentadienyl ring.

The letter "m" is an integer of $0 \leq m \leq 4$, and the letter "n" is an integer of $0 \leq n \leq 4$. Both m and n are preferably 0 or 1, and particularly preferably 0.

Me represents Cr, Co, Fe, Mg, Ni, Os, Ru, V, X—Hf—Y, X—Mo—Y, X—Nb—Y, X—Ti—Y, X—V—Y, or X—Zr—Y and is preferably Fe. X and Y referred herein are each independently hydrogen, halogen or an alkyl group having 1 to 12 carbon atoms and may be the same or different.

Preferred organic compounds for Compound (A) are those represented by formulae (4) through (7) given below:

(4)

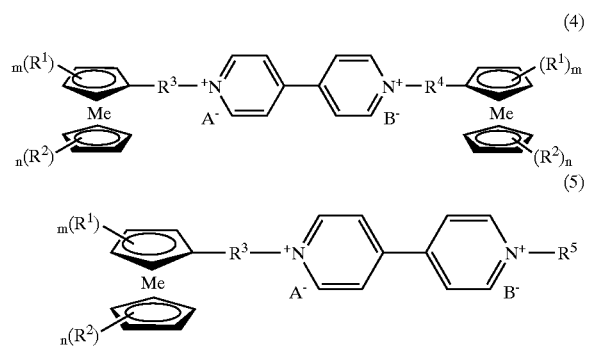

(5)

(6)

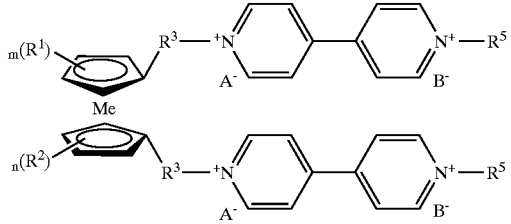

(7)

In formulae (4) through (7), $R^1$, $R^2$, m, n, Me, $A^-$, and $B^-0$ are the same as those as defined in formulae (1) through (3).

$R^3$ and $R^4$ may be the same or different and are each a hydrocarbon residue having 1 to 20 and preferably 1 to 10 carbon atoms. Specific examples of preferred hydrocarbon residues are hydrocarbon groups such as alkylene and a various divalent groups having an ester-(—COO—), ether-(—O—), amide-(—CONH—), thioether-(—S—), amine-(—NH—), urethane-(—NHCOO—), or silyl-(—Si(R)$_2$—) bond unit in a part of the hydrocarbon group.

The divalent group having an ester-bond unit may be exemplified by those represented by the formula —R—COO—R— or —R—OCO—R— wherein R is an alkylene group having 1 to 8 carbon atoms. Specific examples of the ester-bond unit are —$C_4H_8$—COO—$C_2H_4$—, —$C_4H_8$—OCO—$C_2H_4$—, —$C_4H_8$—COO—$C_4H_8$—, and —$C_4H_8$—OCO—$C_4H_8$—. The divalent group having an ether-bond unit may be exemplified by those represented by the formula —R—O—R wherein R is an alkylene group having 1 to 10 carbon atoms. Specific examples of the ether-bond unit are —$C_4H_8$—O—$C_2H_4$— and —$C_4H_8$—O—$C_4H_8$—. The divalent group having an amide-bond unit may be exemplified by those represented by the formula —R—CONH—R— or —R—NHCO—R— wherein R is an alkylene group having 1 to 8 carbon atoms. Specific examples of the amide-bond unit are —$C_4H_8$—CONH—$C_2H_4$—, —$C_4H_8$—NHCO—$C_2H_4$—, —$C_4H_8$—CONH—$C_4H_8$—, and —$C_4H_8$—NHCO—$C_4H_8$—. The divalent group having a thioether-bond unit may be those represented by the formula —R—S—R— wherein R is an alkylene group having 1 to 10 carbon atoms. Specific examples of the thioether-bond unit are —$C_4H_8$—S—$C_2H_4$— and —$C_4H_8$—S—$C_4H_8$—. The divalent group having an amine-bond unit may be exemplified by those represented by the formula —R—NH—R— wherein R is an alkylene group having 1 to 10 carbon atoms and the formula —R—NH-Ph- wherein R is an alkylene group having 1 to 10 carbon atoms and Ph is an arylene group or a substituted arylene group having 1 to 12 carbon atoms. Specific examples of the amine-bond unit are —$C_4H_8$—NH—$C_2H_4$— and —$C_4H_8$—NH—$C_4H_8$—. The divalent group having a urethane-bond unit may be exemplified by those represented by the formula —R—OCONH—R— or —R—NHCOO—R— wherein R is an alkylene group having 1 to 8 carbon atoms. Specific examples of the urethane-bond unit are —$C_4H_8$—

OCONH—C$_2$H$_4$—, —C$_4$H$_8$—NHCOO—C$_2$H$_4$—, —C$_4$H$_8$—OCONH—C$_4$H$_8$—, and —C$_4$H$_8$—NHCOO—C$_4$H$_8$—. The divalent groups having a silyl-bond unit may be represented by those represented by the formula —R—Si(R')$_2$—R— wherein R is an alkylene group having 1 to 8 carbon atoms and R' is methyl or ethyl. Specific examples of the silyl-bond unit are —C$_4$H$_8$—Si(CH$_3$)$_2$—C$_2$H$_4$—, —C$_4$H$_8$—Si(CH$_3$)$_2$—C$_4$H$_8$—, —C$_4$H$_8$—Si(C$_2$H$_5$)$_2$—C$_2$H$_4$—, and —C$_4$H$_8$—Si(C$_2$H$_5$)$_2$—C$_4$H$_8$—.

$R^5$ is a hydrocarbon group selected from the group consisting of a hydrocarbon group such as an alkyl, cycloalkyl, alkenyl, aryl, or aralkyl group having 1 to 20, preferably 1 to 10 carbon atoms, a heterocyclic aromatic group having 4 to 20, preferably 4 to 10 carbon atoms, and a substituted hydrocarbon or heterocyclic aromatic group obtained by substituting part of hydrogens of the hydrocarbon group or heterocyclic aromatic group with a substituent group.

Examples of the alkyl group for $R^5$ are methyl, ethyl, i-propyl, n-propyl, n-butyl, t-butyl, n-pentyl, n-hexyl, and n-heptyl groups. Examples of the cycloalkyl is cyclohexyl group. Examples of the aryl group arephenyl, tolyl, xylyl, and naphthyl. Examples of the alkenyl group are vinyl and allyl groups. Examples of the aralkyl group are benzyl and phenylpropyl groups. Examples of the heterocyclic aromatic group are 2-pyridyl, 4-pyridyl, 2-pyrimidyl, and isoquinoline groups.

Examples of the substituent in the substituted hydrocarbon residue or heterocyclic aromatic group are alkoxy, alkoxycarbonyl, and acyl groups having 1 to 10, preferably 1 to 5 carbon atoms, halogen, and cyano (—CN group), hydroxyl, nitro, and amino groups. Examples of the alkoxy group are methoxy and ethoxy groups. The alkoxycarbonyl group is exemplified by methoxycarbonyl. The acyl group is exemplified by acetyl. The halogen is exemplified by Cl and F. The substituted hydrocarbon residue is exemplified by methoxyphenyl, chlorophenyl, fluorophenyl, methoxychlorophenyl, cyanophenyl, acetylphenyl, methoxycarbonylphenyl, and methoxynaphtyl groups.

Specific examples of compounds represented by formulae (4) through (7) are as follows:

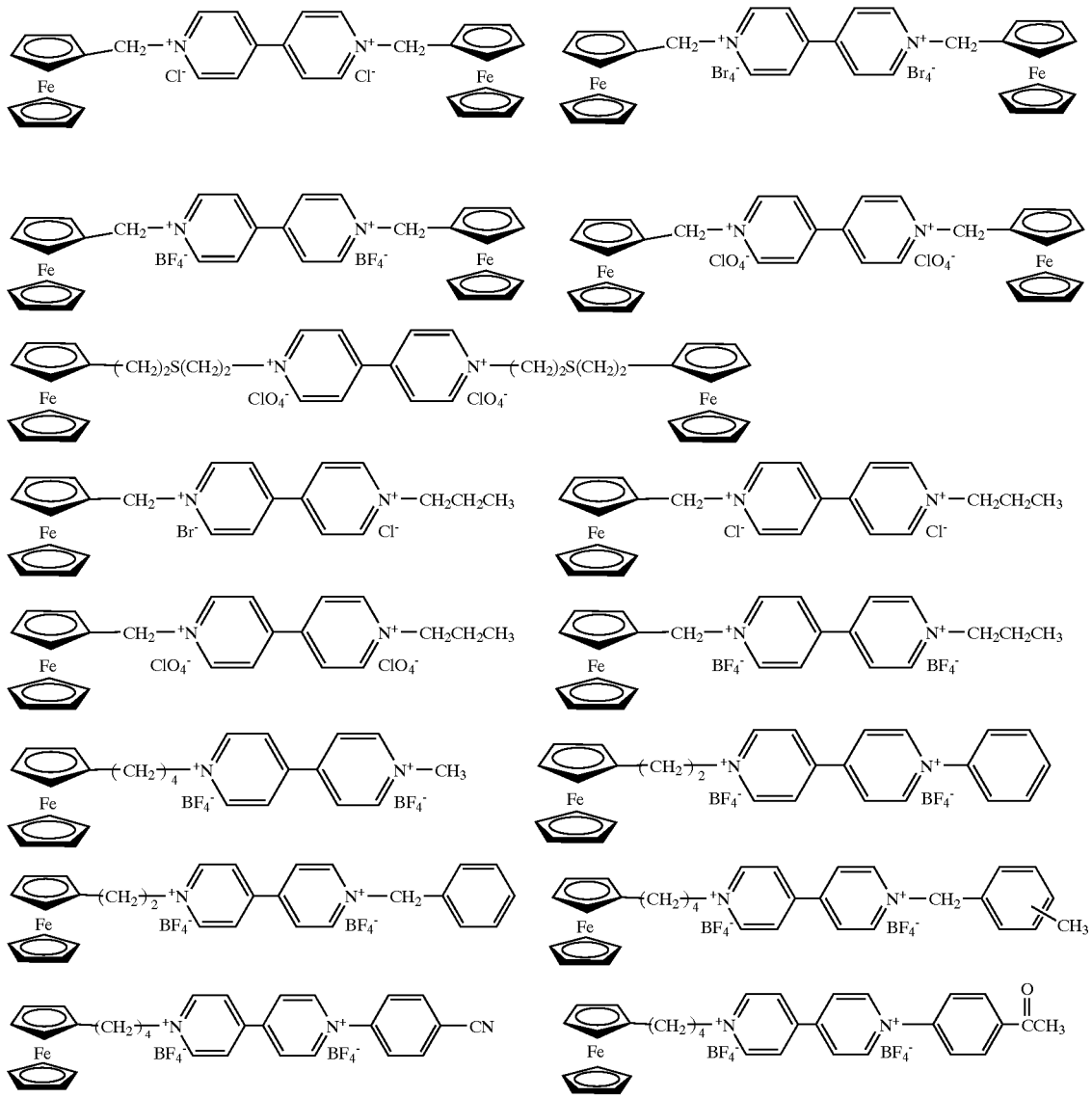

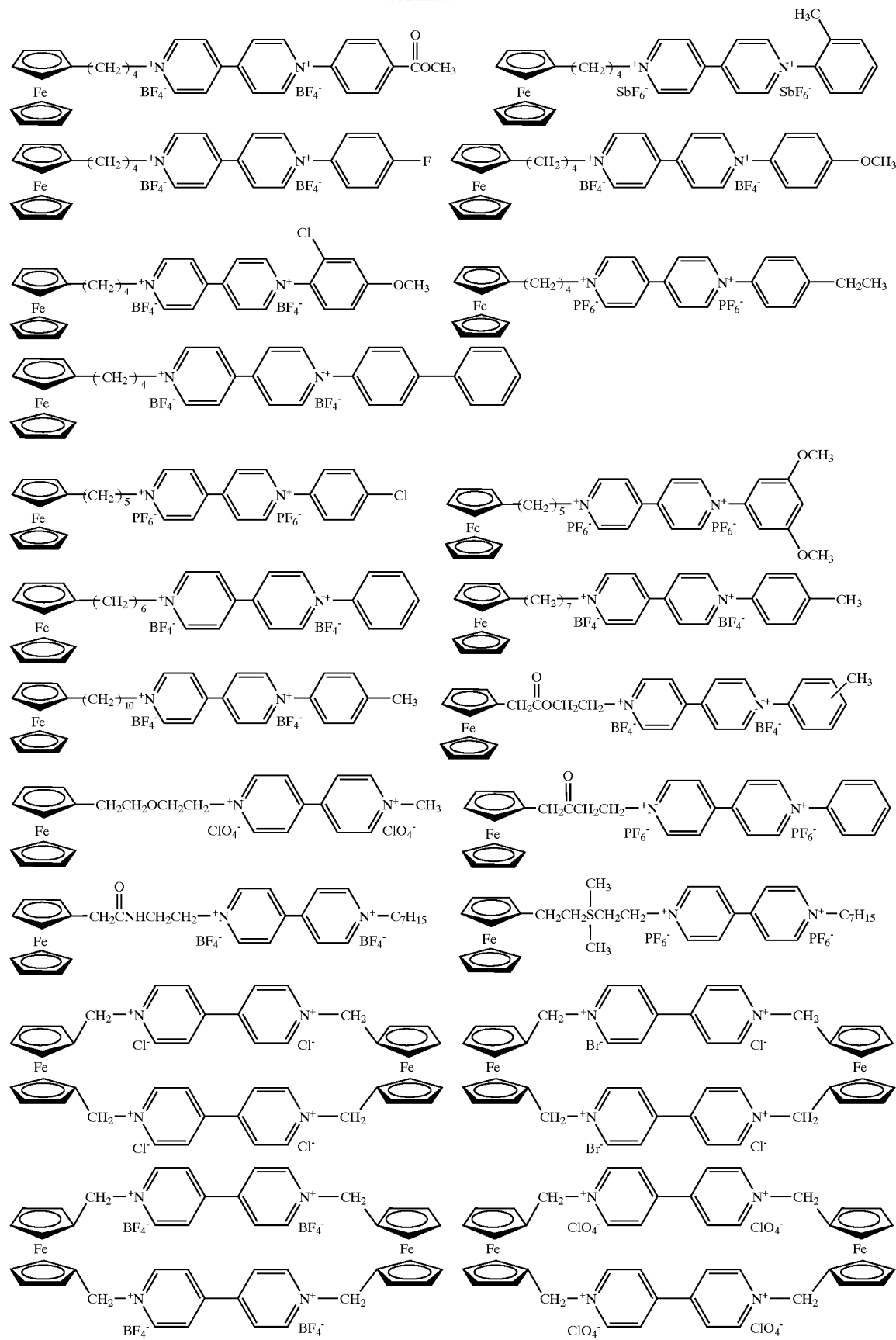

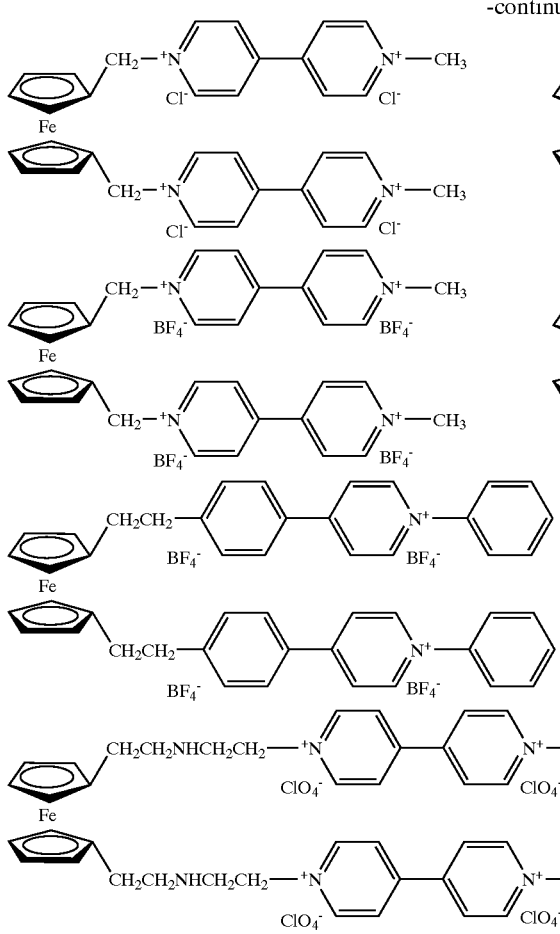
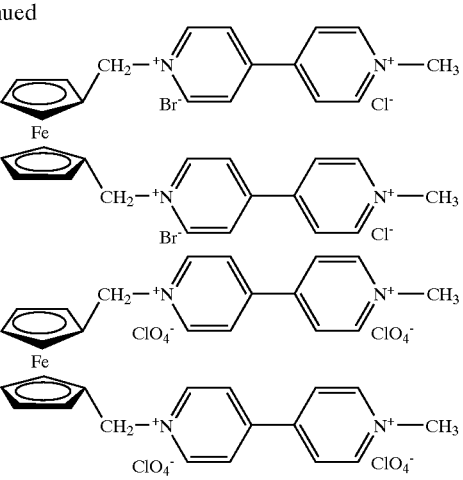

No particular limitation is imposed on the concentration of the electrochromic compound in the ion conductive layer. The lower limit is usually 1 mm, preferably 5 mM, and more preferably 10 mM, and the upper limit is usually 300 mM, preferably 2,000 mM, and more preferably 100 mM.

The ion conductive layer used for the electrochromic mirror of the present invention may be formed using either a liquid-, gelatinized liquid- or solid-type ion conductive substance. Solid-type ion conductive substances is preferably used such that it is possible to produce a solid-type electrochromic mirror for practical use.

Liquid-Type Ion Conductive Substance

A liquid-type ion conductive substance is prepared by dissolving a supporting electrolyte such as salts, acids, and alkalis in a solvent. Such a supporting electrolyte may not be used in the case where the electrochromic active compound is ionic.

Eligible solvents are any type of those generally used in electrochemical cells and batteries. Specific examples of such solvents are water, acetic anhydride, methanol, ethanol, tetrahydrofuran, propylene carbonate, nitromethane, acetonitrile, dimethylformamide, dimethylsulfoxide, hexamethylphosamide, ethylene carbonate, dimethoxyethane, γ-butyrolactone, γ-valerolactone, sulforan, dimethoxyethane, propionnitrile, glutaronitrile, adiponitrile, methoxyacetonitrile, dimethylacetoamide, methylpyrrolidinone, dimethylsulfoxide, dioxolane, trimethylphosphate and polyethylene glycol. Preferred are propylene carbonate, ethylene carbonate, dimethylsulfoxide, dimethoxyethane, acetonitrile, γ-butyrolactone, sulforan, dioxolane, dimethylformamide, dimethoxyethane, tetrahydrofuran, adiponitrile, methoxyacetonitrile, dimethylacetoamide, methylpyrrolidinone, dimethylsulfoxide, dioxolane, trimethylphosphate, and polyethylene glycol. The solvent may be used singlely or in combination.

Although not restricted, the solvent is used in an amount of 20 percent by mass or greater, preferably 50 percent by mass or greater, and more preferably 70 percent by mass of the ion conductive layer. The upper limit is 98 percent by mass, preferably 95 percent by mass, and more preferably 90 percent by mass.

Eligible supporting electrolytes are salts, acids, and alkalis which are generally used in the filed of electrochemistry or batteries.

Salts may be inorganic ion salts such as alkali metal salts and alkaline earth metal salts, quaternary ammonium salts, and cyclic quaternary ammonium salts. Specific examples of such salts are alkali metal salts of Li, Na, and K, such as $LiClO_4$, $LiSCN$, $LiBF_4$, $LiAsF_6$, $LiCF_3SO_3$, $LiPF_6$, $LiI$, $NaI$, $NaSCN$, $NaClO_4$, $NaBF_4$, $NaAsF_6$, $KSCN$ and $KCl$, quaternary ammonium salts such as $(CH_3)_4NBF_4$, $(C_2H_5)_4NBF_4$, $(n-C_4H_9)_4NBF_4$, $(C_2H_5)_4NBr$, $(C_2H_5)_4NClO_4$, and $(n-C_4H_9)_4NClO_4$, and mixtures thereof.

No particular limitation is imposed on acids. Eligible acids are inorganic acids and organic acids, and more specifically sulfuric acid, hydrochloric acid, phosphoric acids, sulfonic acids, and carboxylic acid.

No particular limitation is imposed on alkalis. Eligible alkalis are sodium hydroxide, potassium hydroxide, and lithium hydroxide.

The amount of the supporting electrolyte is arbitrary selected. Generally, the supporting electrolyte is present in an amount of 0.01 Mor greater, preferably 0.1 M or greater, and more preferably 0.5 M or greater. The upper limit is 20 M, preferably 10 M, and more preferably 5 M.

Gelatinized Liquid Ion Conductive Substance

The term "gelatinized liquid ion conductive substance" designates a substance obtained by thickening or gelatinizing the above-described liquid-type ion conductive substance. The gelatinized liquid ion conductive substance is prepared by blending a polymer or a gelatinizer with a liquid-type ion conductive substance.

No particular limitation is imposed on the polymer. Eligible polymers are polyacrylonitrile, carboxymethyl cellulose, poly vinyl chloride, polyethylene oxide, polyurethane, polyacrylate, polymethacrylate, polyamide, polyacrylicamide, cellulose, polyester, polypropylene oxide and nafion.

No particular limitation is imposed on the gelatinizer. Eligible gelatinizers are oxyethylene methacrylate, oxyethylene acrylate, urethaneacrylate, acrylicamide and agar-agar.

Solid-Type Ion Conductive Substance

The term "solid-type ion conductive substance" designates a substance which is solid at room temperature and has an ion conductivity. Such substances are exemplified by polyethyleneoxide, a polymer of oxyethylenemethacrylate, nafion, polystyrene sulfonate, $Li_3N$, $Na$-$\beta$-$Al_2O_3$, and $Sn(HPO_4)_2 \cdot H_2O$. Other than these, there may be used a polymeric solid electrolyte obtained by dispersing a supporting electrolyte in a polymeric compound obtained by polymerizing an oxyalkylene(metha)acrylate-based compound or a urethane acrylate-based compound.

First examples of the polymer solid electrolytes recommended by the present invention are those obtained by solidifying a composition containing the above-described organic polar solvent and supporting electrolyte and a urethaneacrylate represented by formula (8) below.

The term "cure" used herein designates a state where the polymerizable monomer in the mixture is cured with the progress of polymerization or crosslinking and thus the entire mixture does not flow/at room temperature. The composition thus cured often has the basic structure in the form of network (three-dimensional network structure).

Formula (18) is represented by

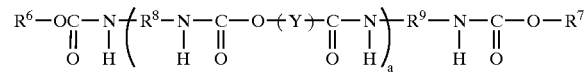

(8)

wherein $R^6$ and $R^7$ may be the same or different and are each independently a group selected from those represented by formulae (9), (10) and (11), $R^8$ and $R^9$ are each independently a divalent hydrocarbon residue having 1 to 20 and preferably 2 to 12 carbon atoms, Y is a divalent group having a polyether bonding unit, a polyester bonding unit, or a polycarbonate bonding unit or a divalent group having two or more of these bonding units, a is an integer of 1 to 100, preferably 1 to 50, and more preferably 1 to 20: formulae (9.), (10) and (11) being represented by

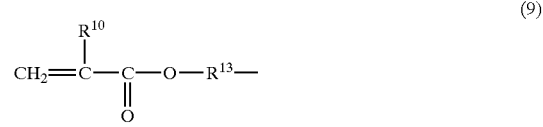

(9)

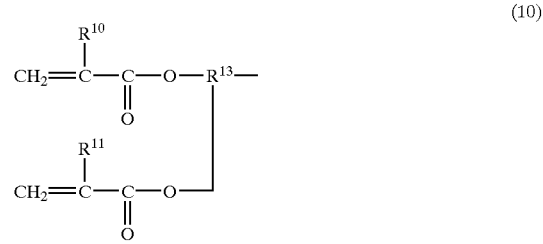

(10)

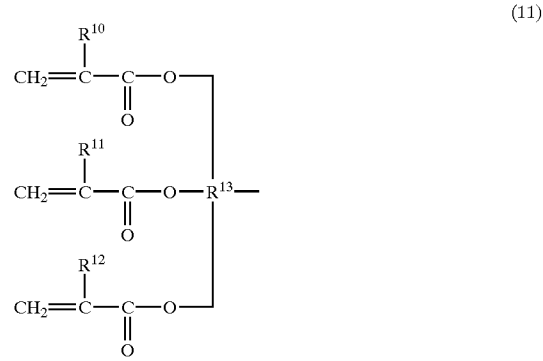

(11)

In formulae (9) through (11), $R^{10}$, $R^{11}$ and $R^{12}$ may be the same or different and are each independently hydrogen or an alkyl group having 1 to 3 carbon atoms and $R^{13}$ is a divalent to quatervalent organic residue having 1 to 20, preferably 2 to 8 carbon atoms. Specific examples of the organic residue are hydrocarbon residues such as alkyltolyl groups, alkyltetratolyl groups and alkylene groups represented by the formula

(12)

In formula (12), $R^{14}$ is an alkyl group having 1 to 3 carbon atoms or hydrogen, b is an integer of 0 to 6 and if b is 2 or greater, the groups of $R^{14}$ may be the same or different.

The hydrogen atoms in formula (12) may be partially substituted by an oxygen-containing hydrocarbon group such as an alkoxy group having 1 to 6, preferably 1 to 3 carbon atoms and an aryloxy group having 6 to 12 carbon atoms.

Specific examples of $R^{10}$, $R^{11}$, and $R^{12}$ in formulae (9) through (11) are hydrogen, methyl, and ethyl.

The divalent hydrocarbon group for $R^8$ and $R^9$ in formula (8) maybe exemplified by aliphatic hydrocarbon groups, aromatic hydrocarbon groups and alicyclic hydrocarbon groups. The aliphatic hydrocarbon group may be an alkylene group represented by formula (12) above.

The divalent aromatic and alicyclic hydrocarbon groups may be exemplified by hydrocarbon groups represented by the following formulae (13), (14) and (15)

(13)

(14)

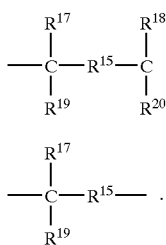

(15)

In formulae (13) through (15), $R^{15}$ and $R^{16}$ may be the same or different and are each independently a phenylene group, a substituted phenylene group (an alkyl-substituted phenylene group), a cycloalkylene group and a substituted cycloalkylene group (an alkyl-substituted cycloalkylene group), and $R^{17}$, $R^{18}$, $R^{19}$ and $R^{20}$ are each independently hydrogen or an alkyl group having 1 to 3 carbon atoms, and c is an integer of 1 to 5.

Specific examples of $R^8$ and $R^9$ in formula (8) are the following divalent groups:

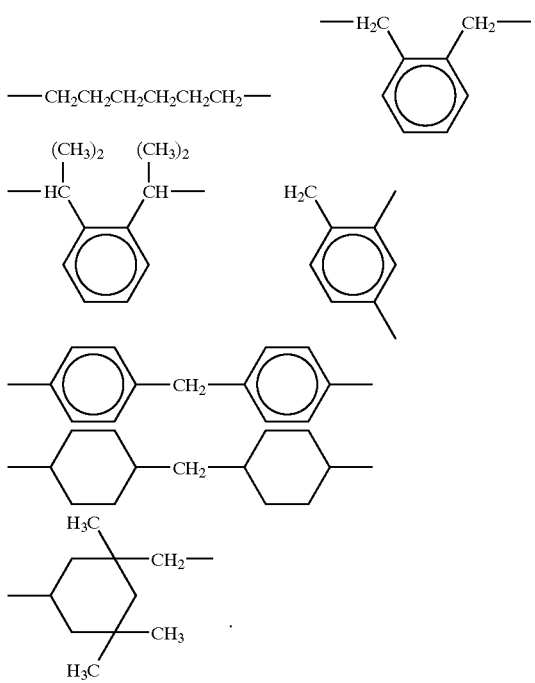

In formula (8), Y indicates a divalent group having a polyether bonding unit, a polyester bonding unit, or a polycarbonate bonding unit or a divalent group having two or more of these bonding units. Examples of these divalent groups are those represented by the following formulae:

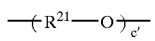 (a)

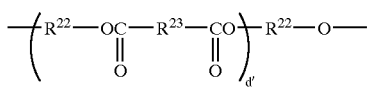 (b)

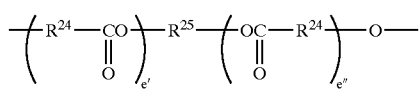 (c)

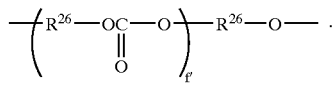 (d)

In formulae (a) through (d), $R^{21}$, $R^{22}$, $R^{23}$, $R^{24}$, $R^{25}$ and $R^{26}$ may be the same or different and are each independently a divalent hydrocarbon group residue having 1 to 20 and preferably 2 to 12 carbon atoms. $R^{21}$, $R^{22}$, $R^{23}$ $R^{24}$, $R^{25}$ and $R^{26}$ is preferably a straight-chain or branched alkylene group. More specifically, $R^{23}$ is preferably methylene, ethylene, trimethylene, tetramethylene, pentamethylene, hexamethylene, and propylene groups. Specific examples of $R^{21}$, $R^{22}$, $R^{24}$, $R^{25}$ and $R^{26}$ are ethylene and propylene groups. c' is an integer of 2 to 300, preferably 10 to 200. d' is an integer of 1 to 300, preferably 2 to 200. e' is an integer of 1 to 200, preferably 2 to 100. e" is an integer of 1 to 200, preferably 2 to 100. f' is an integer of 1 to 300, preferably 10 to 200.

In formulae (a) through (d), each of the units may be the same or different. In other words, if there exist a plurality of the groups of each $R^{21}$ through $R^{26}$, the groups of each $R^{21}$ through $R^{26}$ may be the same or different.

The urethaneacrylate of formula (8) has a molecular-average molecular weight in the range of 2,500 to 30,000, preferably 3,000 to 20,000 and has preferably 2 to 6, more preferably 2 to 4 functional groups per molecule. The urethaneacrylate of formula (8) may be prepared by any suitable conventional method and thus no particular limitation is imposed on the method.

A polymeric solid electrolyte containing a urethaneacrylate of formula (8) is prepared by admixing a urethaneacrylate, a solvent and a supporting electrolyte both described with respect to the liquid type ion conductive substance so as to obtain a precursor composition and solidifying the composition. The amount of the solvent is selected from the range of 100 to 1,200 parts by weight, preferably 200 to 900 parts by weight per 100 parts by weight of the urethaneacrylate. A too less amount of the solvent would result in insufficient ion conductivity, while a too much amount of the solvent would cause reduced mechanical strength. The amount of the supporting electrolyte is 0.1 to 30 percent by mass, preferably 1 to 20 percent by mass of the amount of the solvent.

If necessary, cross-linkers or polymerization initiators may be added to the polymeric solid electrolyte containing the urethaneacrylate.

Second examples of the polymeric solid substance recommended by the present invention are those obtained by solidifying a composition comprising a solvent, a supporting electrolyte, an acryloyl- or methacrylate-modified polyalkylene oxide (both hereinafter referred to as "modified polyalkylene oxide").

The modified polyalkylene oxide encompasses monofunctional-, bifunctional- and polyfunctional-modified polyalkylene oxides. These modified polyalkylene oxides may be used individually or in combination. It is preferred to use a monofunctional modified polyalkylene oxide as an essential component in combination with bifunctional and/or polyfunctional ones. It is particularly preferred to use a monofunctional modified polyalkylene oxide mixed with a bifunctional one. The mix ratio is arbitrary selected.

Bifunctional- and/or polyfunctional-modified polyalkylene oxides are used in a total amount of 0.1 to 20 parts by mass, preferably 0.5 to 10 parts by mass of 100 parts by mass of a monofunctional polyalkylene oxide.

A monofunctional modified polyalkylene oxide is represented by the formula

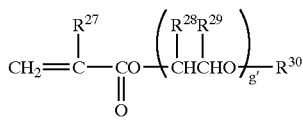
(16)

wherein $R^{27}$, $R^{28}$, $R^{29}$ and $R^{30}$ are each hydrogen and an alkyl group having from 1 to 5 carbon atoms and g' is an integer of 1 or greater.

In formula (16), examples of the alkyl group of $R^{27}$, $R^{28}$, $R^{29}$ and $R^{30}$ which may be the same or different include methyl, ethyl, i-propyl, n-propyl, n-butyl, t-butyl and n-pentyl. Preferred for $R^{27}$, $R^{28}$ and $R^{29}$ are hydrogen and a methyl group. Preferred for $R^{30}$ are hydrogen and methyl and ethyl groups.

In formula (16), g' is an integer of 1 or greater and within the range of usually $1 \leq g' \leq 100$, preferably $2 \leq g' \leq 50$, and more preferably $2 \leq g' \leq 30$.

Specific examples of the compound of formula (16) are those having 1 to 100, preferably 2 to 50, more preferably 2 to 20 oxyalkylen units, such as methoxypolyethylene glcyol methacrylate, methoxypolypropylene glycol methacrylate, ethoxypolyethylene glycol methacrylate, ethoxypolypropylene glycol methacrylate, methoxypolyethylene glycol acrylate, methoxypolypropylene glycol acrylate, ethoxypolyethylene glycol acrylate, ethoxypolypropylene glycol acrylate and mixtures thereof. Among these, preferred are methoxypolyethylene glcyol methacrylate and methoxypolyethylene glycol acrylate.

If g' is 2 or greater, the monofunctional modified polyalkylene oxide may be those having different oxyalkylene units, that is, copolymerized oxyalkylene units which may be alternating-, block- or random-polymerized and have 1 to 50, preferably 1 to 20 oxyethylene units and 1 to 50, preferably 1 to 20 oxypropylene units. Specific examples of such copolymers are methoxypoly(ethylene.propylene) glycol methacrylate, ethoxypoly(ethylene.propylene)glycol methacrylate, methoxypoly(ethylene.propylene)glycol acrylate, ethoxypoly(ethylene.propylene)glycol acrylate and mixtures thereof.

The difunctional modified polyalkylene oxide is represented by the formula (17)

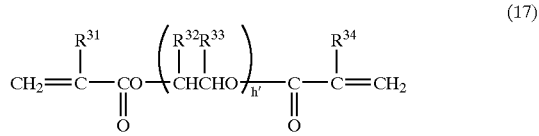

wherein $R^{31}$, $R^{32}$, $R^{33}$ and $R^{34}$ are each independently hydrogen or an alkyl group having 1 to 5 carbon atoms and h' is an integer of 1 or greater.

The polyfunctional modified polyalkylene oxide having 3 or more functional groups is represented by the formula

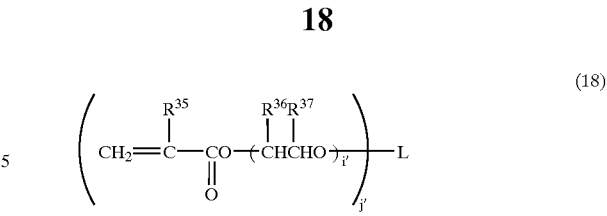
(18)

wherein $R^{35}$, $R^{36}$ and $R^{37}$ are each independently hydrogen or an alkyl group having 1 to 5 carbon atoms, i' is an integer of 1 or greater, j' is an integer of 2 to 4, and L is a connecting groups of valence represented by "j'".

In formula (17), $R^{31}$, $R^{32}$, $R^{33}$, and $R^{34}$ are each independently hydrogen or an alkyl group having 1 to 5 carbon atoms. Specific examples of the alkyl group are methyl, ethyl, i-propyl, n-propyl, n-butyl, t-butyl, and n-pentyl groups. It is preferred that $R^{31}$ is hydrogen or methyl group, $R^{32}$ is hydrogen or methyl group, $R^{33}$ is hydrogen or methyl group, and $R^{34}$ is hydrogen or methyl group.

The letter "h'" in formula (17) is an integer of 1 or greater and within the range of usually $1 \leq h' \leq 100$, preferably $2 \leq h' \leq 50$, more preferably $2 \leq h' \leq 30$. Specific examples of such compounds are those having 1 to 100, preferably 2 to 50, more preferably 1 to 20 of oxyalkylene units, such as polyethylene glycol dimethacrylate, polypropylene glycol dimethacrylate, polyethylene glycol methacrylate, polypropylene glycol dimethacrylate, and mixtures thereof.

If h' is 2 or greater, the difunctional modified polyalkylene oxide may be those having different oxyalkylene units, that is, copolymerized oxyalkylene units which may be alternating-, block- or random-polymerized and have 1 to 50, preferably 1 to 20 oxyethylene units and 1 to 50, preferably 1 to 20 oxypropylene units. Specific examples of such copolymers are poly(ethylene.propylene)glycol dimethacrylate, poly(ethylene.propylene)glycol diacrylate, and mixtures thereof.

$R^{35}$, $R^{36}$ and $R^{37}$ in formula (18) are each independently hydrogen or an alkyl group having 1 to 5 carbon atoms. Specific examples of the alkyl group are methyl, ethyl, i-propyl, n-propyl, n-butyl, t-butyl and n-pentyl groups. $R^{35}$, $R^{36}$ and $R^{37}$ are each preferably hydrogen or methyl group.

In formula (18), i' is an integer of 1 or greater and within the range of usually $1 \leq i' \leq 100$, preferably $2 \leq i \leq 50$, and more preferably $2 \leq i' \leq 30$.

The letter "j'" denotes a number of connecting group "L" and is an integer of $2 \leq j' \leq 4$.

Connecting group "L" is a divalent, trivalent or quatravalent hydrocarbon group having 1 to 30, preferably 1 to 20 carbon atoms. The divalent hydrocarbon group may be alkylene, arylene, arylalkylene and alkylarylene groups and hydrocarbon groups having those groups as a main chain. Specific examples of the divalent hydrocarbon group are a methylene group, an ethylene group and a group represented by

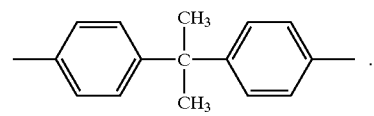

The trivalent hydrocarbon group may be alkyltriyl, aryltriyl, arylalkyltriyl, alkylaryltriyl and hydrocarbon groups having those groups as the main chain. Specific examples of the trivalent hydrocarbon group are those represented by the following formulae

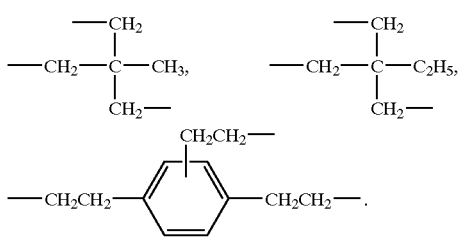

The quatravalent hydrocarbon group may be alkyltetrayl, aryltetrayl, arylalkyltetrayl and alkylaryltetrayl groups and hydrocarbon groups having these groups as the main chain. Specific examples of the quatravalent hydrocarbon groups are those represented by the following formulae:

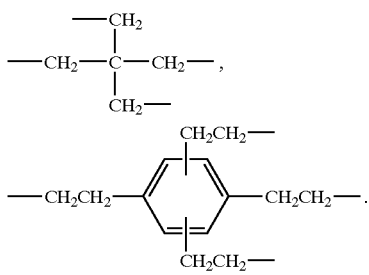

Specific examples of the compound are those having 1 to 100, preferably 2 to 50, more preferably 1 to 20 oxyalkylene units, such as trimethylolpropane tri (polyethylene glycol acrylate) trimethylolpropane tri(polyethylene glycol methaacrylate), trimethylolpropane tri (polypropylene glycol acrylate), trimethylolpropane tri(polypropylene glycol methaacrylate), tetramethylolmethane tetra(polyethylene glycol acrylate), tetramethylolmethane tetra(polyethylene glycol methaacrylate), tetramethylolmethane tetra (polypropylene glycol acrylate), tetramethylolmethane tetra (polypropylene glycol methaacrylate), 2,2-bis[4-(acryloxypolyethoxy)phenyl]propane, 2,2-bis[4-(methaacryloxypolyethoxy)phenyl]propane, 2,2-bis[4-(acryloxypolyisopropoxy)phenyl]propane, 2,2-bis[4-(methaacryloxypolyisopropoxy)phenyl]propane and mixtures thereof.

If i' in formula (18) is 2 or greater, the compound may be those having different oxyalkylene units from each other, that is, copolymerized oxyalkylene units which result from alternating-, block- or random-copolymerization. Specific examples of such compounds are those having 1 to 50, preferably 1 to 20 of oxyethylene units and 1 to 50, preferably 1 to 20 of oxypropylene units such as trimethylolpropane tri(poly(ethylene.propylene)glycol acrylate), trimethylolpropane tri(poly(ethylene.propylene)glycol methaacrylate), tetramethylolmethane tetra(poly (ethylene.propylene)glycol acrylate), tetramethylolmethane tetra(poly(ethylene.propylene)glycol acrylate) and mixtures thereof.

There may be used the difunctional modified polyalkyleneoxide of formula (17) and the polyfunctional modified polyalkyleneoxide of formula (18) in combination. When these compounds are used in combination, the weight ratio of these compounds is within the range of 0.01/99.9-99.9/0.01, preferably 1/99-99/1, more preferably 20/80-80/20.

A polymeric solid electrolyte containing the above-described modified polyalkylene oxide is prepared by admixing the modified polyalkylene oxide, a solvent and a supporting electrolyte both described with respect to the liquid type ion conductive substance so as to obtain a precursor composition and solidifying the composition. The amount of the solvent is selected from the range of 50 to 800 percent by mass, preferably 100 to 500 percent by mass per of the total mass of the modified polyalkylene oxide. The amount of the supporting electrolyte is within the range of from 1 to 30 percent by mass and preferably 3 to 20 percent by mass of the total amount of the modified polyalkylene oxide and the solvent.

If necessary, cross-linkers or polymerization initiators may be added to the polymeric solid electrolyte containing the modified polyalkylene oxide.

Cross-linkers which may be added to the polymeric electrolyte are acrylate-based cross-linkers having two or more functional groups. Specific examples are ethylene glycol dimethacrylate, diethylene glycol dimethacrylate, tetraethylene glycol dimethacrylate, ethylene glycol diacrylate, diethylene glycol diacrylate, triethylene glycol diacrylate, polyethylene glycol dimethacrylate, polyethylene glycol diacrylate, neopentyl glycol diacrylate, 1,6-hexanediol diacrylate, trimethylolpropane trimethacrylate, trimethylolpropane triacrylate, tetramethylolmethane tetracrylate, and tetramethylolmethane tetramethacrylate. These may be used individually or in combination.

The amount of the cross-linker is 0.01 percent by mol or more, preferably 0.1 percent by mol or more, of 100 percent by mole of the polymeric urethaneacrylate or modified polyalkylene oxide contained in the polymeric solid electrolyte. The upper limit is 10 percent by mol and preferably 5 percent by mol.

Polymerization initiators which may be added to the polymeric solid electrolyte are photo-polymerization initiators and thermal-polymerization initiators.

No particular limitation is imposed on the type of the photo-polymerization initiators. Therefore, the photo-polymerization initiators may be conventional ones which are benzoin-, acetophenone-, benzylketal- or acylphosphine oxide-based. Specific examples of such photo polymerization initiators are acetophenone, benzophenone, 4-methoxybenzophenone, benzoin methyl ether, 2,2-dimethoxy-2-phenyldimethoxy-2-phenylacetophenone, 2-methylbenzoyl, 2-hydroxy-2-methyl-1-phenyl-1-on, 1-(4-isopropylphenyl)-2-hydroxy-2-methylpropane-1-on, triphenylphosphine, 2-chlorothioxantone, 2-hydroxy-2-methyl-1-phenylpropane-1-on, 1-hydroxycyclohexylphenylketone, 2,2-dimethoxy-2-phenylacetophenone, 2-methyl-(4-(methylthio)phenyl)-2-morpholino-1-propanone, 2-benzyl-2-dimethylamino-1-(4-morpholinophenyl)-butane-1-on, 1-(4-(2-hydroxyethoxy) phenyl)-2-hydroxy-2-methyl-1-on, diethoxyacetophenone, and 2,4,6-trimethylbenzoyldiphenylphosphine oxide. These may be used individually or in combination.

Eligible thermal polymerization initiators may be selected from known initiators such as peroxide initiators or azo-based initiators. Specific examples of such peroxide initiators are benzoyl peroxide, methylethyl peroxide, t-butylperoxypivalate and diisopropylperoxycarbonate. Specific examples of such azo-based initiators are 2,2'-azobis (2-isobutylonitrile), 2,2'-azobisisobutylonitrile, 2,2'-azobis (2,4-dimethylvaleronitrile), and 1,1'-azobis(cyclohexane-1-carbonitrile). These may be used individually or in combination.

The amount of the polymerization initiators is 0.1 part by mass or more, 0.5 part by mass or more, of 100 parts by mass of the polymeric urethaneacrylate or modified polyalkylene oxide contained in the polymeric solid electrolyte. The upper limit is 10 part by mass or less and preferably 5 part by mass or less.

The polymeric solid electrolyte is solidified by photo- or thermal-curing the polymeric urethaneacrylate or modified alkylene oxide.

Photo-curing is progressed by irradiating far ultraviolet rays, ultraviolet rays or visible rays to the polymeric solid electrolyte containing a photo-polymerization initiators. Eligible light sources are high voltage mercury lamps, fluorescent lamps and xenon lamps. Although not restricted, the photo polymerization is conducted by irradiating light of 100 $mJ/cm^2$ or higher, preferably 1,000 $J/cm^2$ or higher. The upper limit is 50,000 $mJ/cm^2$, preferably 20,000 $mJ/cm^2$.

Thermal curing is progressed by heating the polymeric solid electrolyte containing a thermal-polymerization initiators at a temperature of 0° C. or higher and preferably 20° C. or higher. The heating temperature is 130° C. or lower and preferably 80° C. or lower. The curing is continued for usually 30 minutes or longer and preferably one hour or longer and 100 hours or shorter and preferably 40 hours or shorter.

The present invention is characterized in that spacers are arranged in the above-described ion conductive layer and the difference in refraction index between the spacers and the ion conductive layer is ±0.03 or less.

Eligible spacers are those having the difference in refraction index than the ion conductive layer of ±0.03 or less, preferably ±0.02 or less, and more preferably ±0.01 or less.

No particular limitation is imposed on the shape of the spacers which may be in the form of beads, pellets or belts. Practically preferred are beads.

No particular limitation is imposed on the materials for the spacers as long as they are free from a short circuit between the substrates, can maintain the space between the substrates, and have the difference in refraction indexes than the ion conductive layer of ±0.03 or less. For example, there may be used various glasses such as quarts glass and soda-lime glass, and various resins such as acrylic-, polypropylene carbonate)-, or vinylbenzene-based resins. Most suitable spacers are acrylic resin spacers obtained by copolymerizing a monomer containing a fluorine atom or an aromatic monomer because the refraction index of the spacers can be adjusted by changing the blend ratio of these monomers. Such resin spacers may be produced by any suitable method such as emulsion polymerization or seed polymerization.

Generally, the refraction index of the spacers are adjusted such that the difference in refraction index than the ion conductive layer becomes ±0.03 or less. However, alternatively, the refraction index of the ion conductive layer may be adjusted such that the difference than the spacers becomes ±0.03 or less.

No particular limitation is imposed on the method of adjusting the refraction index of the ion conductive layer. For example, the adjustment may be conducted by adding a fluorine-containing compound or an aromatic compound and adjusting the amount thereof.

No particular limitation is imposed on the size of the spacers. For example, in the case of beads-like spacers, their upper limit particle size is generally 1,000 µm, preferably 500 µm, more preferably 200 µm, and most preferably 150 µm, while the lower limit is generally 1 µm, preferably 10 µm, more preferably 20 µm, and most preferably 50 µm. The spacers other than beads has preferably a similar size.

No particular limitation is imposed on the amount of the spacers. However, the amount of the spacers is generally 1 to 100,000 per $cm^2$ and preferably 3 to 50,000 per $cm^2$.

The measurement of refraction index is usually conducted using an Abbe refractometer. In the present invention, the measurement was conducted using a Na-D ray at a temperature of 20° C. The refraction index of the spacers can be readily measured with a combination of a liquid-immersion method and an Abbe refractometer.

The EC mirror of the present invention may be produced by any suitable method. For instance, in the case where the ion conductive substance is of liquid type or gelatinized liquid type, the EC mirror of the present invention may be produced by positioning two electrically conductive substrates via the spacers of the present invention therebetween in spaced-apart relationship such that their conductive surfaces face each other; sealing the peripheral edges of the substrates except a portion to be used as an inlet; injecting through the inlet an ion conductive substance containing an electrochromic compound into the space by vacuum- or atmospheric-injection or a meniscus method; and sealing the inlet. Alternatively, depending on the type of ion conductive substance, the EC mirror of the present invention may be produced by forming an ion conductive layer containing an electrochromic compound over one of the two electrically conductive substrates by sputtering, deposition, or sol-gel method and then superimposing the other substrate thereover via the spacers. Further alternatively, the EC mirror may be produced by forming the ion conducive substance containing an electrochromic compound into a film beforehand and laminating the film via spacers between two electrically conductive substrates.

In the case of using the solid ion conductive substance, particularly a polymeric solid electrolyte containing a urethaneacrylate or a acryloyl- or methacryloyl-modified alkylene oxide, the EC mirror of the present invention may be prepared by positioning two electrically conductive substrates via the spacers of the present invention in spaced-apart relationship such that their conductive surfaces face each other; sealing the peripheral edges of the substrates except a portion to be used as an inlet; injecting through the inlet an unsolidified polymeric solid electrolyte precursor containing an electrochromic compound into the space by vacuum- or atmospheric-injection or a meniscus method; and curing the polymeric electrolyte with a suitable means after sealing the inlet.

The basic structure of the EC mirror of the present invention will be described with reference to the annexed drawings.

The electrochromic mirror shown in FIG. 1 has such a structure that an ion conductive layer 4 in which an electrochromic compound is dispersed is arranged in a certain space defined by positioning via spacers 9 a transparent electrically conductive substrate formed with a transparent substrate 1 and a transparent electrode layer 2 laminated over one surface thereof and a reflective electrically conductive substrate formed with a transparent or opaque substrate 6 and a reflective electrode layer 5 laminated over one surface thereof, such that the electrode layers 2, 5 face each other.

Figure 2:
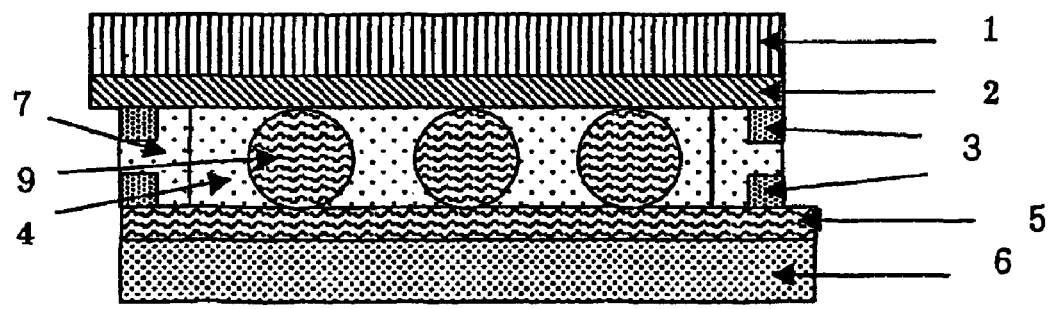
FIG. 2 is a cross-sectional view showing another example of the electrochromic mirror according the present invention.

The electrochromic mirror shown in FIG. 2 has such a structure that an ion conductive layer 4 in which an electrochromic compound is dispersed is arranged in a certain space defined by positioning via spacers 9 a transparent electrically conductive substrate formed with a transparent substrate 1, a transparent electrode layer 2 laminated over one surface thereof, and an additional electrode layer 3 arranged on the peripheries of the electrode layer 2 and a reflective electrically conductive substrate formed with a transparent or opaque substrate 6 and a reflective electrode layer 5 laminated over one surface thereof, and an additional electrode layer 3 arranged on the peripheries of the electrode layer 5, such that the electrode layers 2, 5 face each other.

Figure 3:
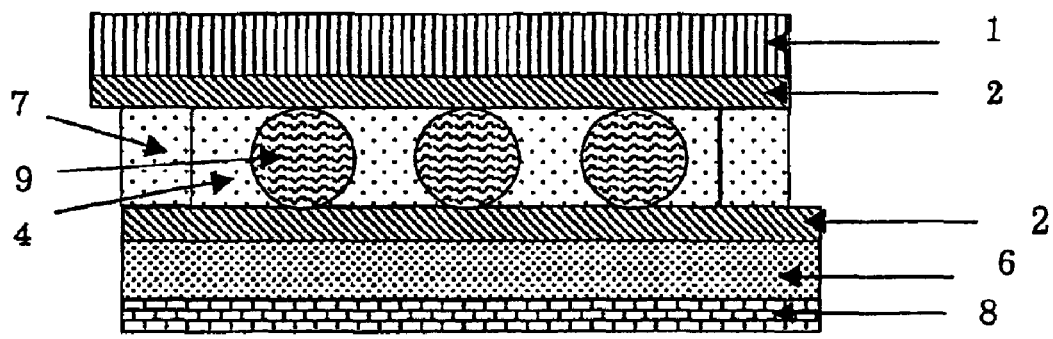
FIG. 3 is a cross-sectional view showing another example of the electrochromic mirror according the present invention.

The electrochromic mirror shown in FIG. 3 has such a structure that an ion conductive layer 4 in which an electrochromic compound is dispersed is arranged in a certain space defined by positioning via spacers 9 a transparent electrically conductive substrate formed with a transparent substrate 1 and a transparent electrode layer 2 laminated over one surface thereof and a reflective electrically conductive substrate formed with a transparent substrate 6, a transparent electrode layer 2 laminated over one surface thereof, and a reflective layer 8 laminated over the other surface such that the electrode layers 2, 2 face each other.

Figure 4:
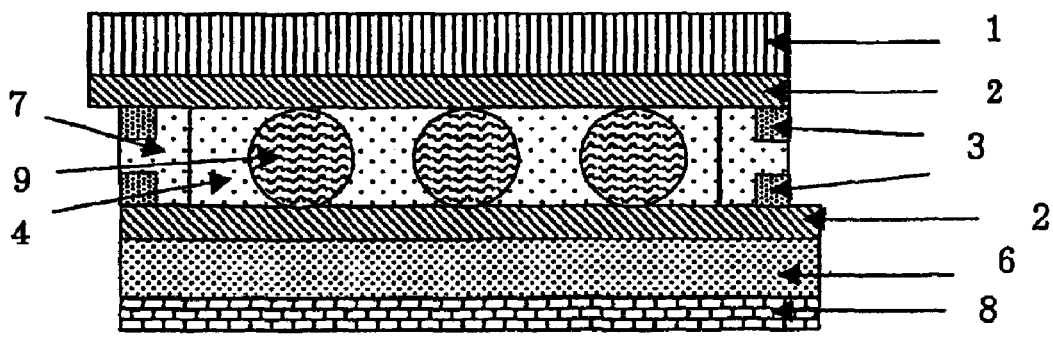
FIG. 4 is a cross-sectional view showing another example of the electrochromic mirror according the present invention.

The electrochromic mirror shown in FIG. 4 has such a structure that an ion conductive layer 4 in which an electrochromic compound is dispersed is arranged in a certain space defined by positioning via spacers 9 a transparent electrically conductive substrate formed with a transparent substrate 1, a transparent electrode layer 2 laminated over one surface thereof, and an additional electrode layer 3 arranged on the peripheries of the electrode layer 2 and a reflective electrically conductive substrate formed with a transparent substrate 6, a transparent electrode layer 2 laminated over one surface thereof, an additional electrode layer 3 arranged on the peripheries of the electrode layer 2, and a reflective layer 8 laminated over the other surface of the substrate 6, such that the electrode layers 2, 2 face each other.

The EC mirrors shown in FIGS. 1 through 4 may be produced by any suitable method. For example, the transparent electrically conductive substrates shown in FIGS. 1 through 4 are each produced by the above-described methods. That is, the transparent electrically conductive substrates can be produced by forming a transparent electrode layer 2 over a transparent substrate 1 and alternatively further an additional electrode layer 3 over the transparent electrode layer 2.

The reflective electrically conductive substrates shown in FIGS. 1 through 4 are each produced by the above-described methods. That is, the reflective electrically conductive substrates shown in FIGS. 1 and 2 can be produced by forming a reflective electrode layer 5 over a transparent or opaque substrate 6 and alternatively further an additional electrode layer 3 over the transparent electrode layer 2. The reflective electrically conductive substrates shown in FIGS. 3 and 4 can be produced by forming a transparent electrode layer 2 over one surface of a transparent substrate 6, alternative further an additional electrode layer 3 over the transparent electrode layer 2, and a reflection layer 8 over the other surface of the transparent substrate 6. The transparent electrically conductive substrate and the reflective electrically conductive substrate produced in such a manner are placed via spacers 9 therebetween so as to be spaced 1 to 1,000 μm apart, facing each other. The peripheries, except a portion to be used as an inlet, of the substrates are sealed with a sealant 7 thereby forming an empty cell with an inlet. A composition for forming an ion conductive layer is injected through the inlet into the cell by the above-described method and then cured, if necessary, so as to form the ion conductive layer 4 thereby obtaining an EC mirror as shown in FIGS. 1 through 4.

Alternatively, a laminate is produced by forming a transparent electrode layer 2, an electrode layer 3, and an ion conductive layer 4 over a transparent substrate 1 in this order. The laminate and a reflective electrically conductive substrate produced in the above described manner are placed via spacers 9 therebetween so as to be spaced 1 to 1,000 μm apart, such that the ion conductive layer of the laminate faces the electrode layer 2 of the reflective electrically conductive substrate, followed by sealing the peripheries of the substrates with a sealant 7.

Further alternatively, a transparent electrically conductive substrate is produced in the above described manner, while a reflective electrically conductive substrate having on its electrode layer 2 an ion conductive layer 4 is produced. The transparent electrically conductive substrate and the reflective electrically conductive substrate are placed via spacers 9 therebetween so as to be spaced 1 to 1,000 μm apart, such that the electrode layer 2 of the transparent electrically conductive substrate faces the ion conductive layer, followed by sealing the peripheries of the substrates with a sealant 7.

As described above, an electrochromic mirror is produced in which the ion conductive layer containing spacers is provided in a space formed therewith between a transparent electrically conductive substrate and a reflective electrically conductive substrate. The spacers arranged in this manner can maintain a cell gap even though the thickness of the substrates are reduced. Furthermore, because the difference in refraction index between the spacers and the ion conductive layer is ±0.03 or less, the spacers are recognized as a part of the ion conductive layer when viewing the mirror and thus do not bother the driver.

Therefore, even though the spacers are contained in the ion conductive layer, they can provide an excellent cell gap without bothering the driver and thus make it possible to reduce the thickness of the substrates and thus lighten the resulting EC mirror.

EXAMPLES

The present invention will now be described with reference to the following examples but not limited thereto.

Synthesis 1

Synthesis of Acrylic Spacers

To a stainless polymerization vessel equipped with a stirrer, a thermometer, and a tube for introducing nitrogen gas were charged 140 parts by mass of water. After 0.33 part by mass of polyvinyl alcohol manufactured by KURARAY under the name of KURARAY POVAL PVA-235 was dissolved in the vessel, 40 parts by mass of methylmethacrylate dissolving 0.6 part by mass of benzoyl peroxide, 55 parts by mass of trifluoroethylmethacrylate, and 5 parts by mass of ethylene glycol dimethacrylate were added and heated at a temperature of 75° C. for 5 hours while stirring slowly at a constant velocity thereby completing a suspension polymerization. After the mixture was spin-dried, it was rinsed and dried. The resulting particles were sieved thereby obtaining spacers with a particle diameter of about 120 μm. The refraction index of the resulting spacers was 1.410.

Synthesis 2

Synthesis of Acrylic Spacers

To a stainless polymerization vessel equipped with a stirrer, a thermometer, and a tube for introducing nitrogen gas were charged 140 parts by mass of water. After 0.33 part by mass of polyvinyl alcohol manufactured by KURARAY under the name of KURARAY POVAL PVA-235 was dissolved in the vessel, 40 parts by mass of methylmethacrylate dissolving 0.6 part by mass of benzoyl peroxide, 45 parts by mass of trifluoroethylmethacrylate, and 5 parts by mass of ethylene glycol dimethacrylate were added and heated at a temperature of 75° C. for 5 hours while stirring slowly at a constant velocity thereby completing a suspension polymerization. After the mixture was spin-dried, it was rinsed and dried. The resulting particles were sieved thereby obtaining spacers with a particle diameter in the range of about 53 to 63 μm. The refraction index of the resulting spacers was 1.463.

Example 1

A laminate was prepared by forming a thin film of palladium of 2 Ω/sq. as a highly reflective electrode, over a substrate. An epoxy sealant in which glass beads with a particle diameter of about 120 μm were kneaded was applied in the form of lines along the peripheral edges of the palladium film layer of the laminate with a dispenser. The spacers with a particle diameter of 120 μm and a refraction index of 1.410 obtained in Synthesis 1 were spread over the palladium film layer surface of the laminate. A transparent glass substrate coated with ITO of 10 Ω/sq. was superposed over the laminate such that the ITO surface and the palladium film layer face each other and then the epoxy sealant was cured with pressurizing thereby forming a hallow cell with an injection port. The cell gap of the resulting cell was about 125 μm. At this point, the spacers were fully perceived.

To a mixed solution of 5.0 g of propylene carbonate and 0.03 g of 2-(5-methyl-2-hydroxyphenyl)benzotriazole manufactured by CIBA-GEIGY under the trade name of TINUVIN P were added tetrafluoroboric acid tetrabutylammonium, a cathodic electrochromic compound represented by the formula below, and an anodic electrochromic compound represented by the formula below such that their concentrations are made 0.5 M, 50 mM, and 30 mM, respectively, thereby obtaining a homogeneous solution with a refraction index of 1.420:

Cathodic Electrochromic Compound

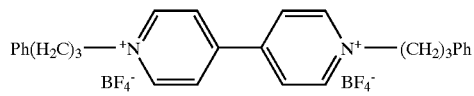

Anodic Electrochromic Compound

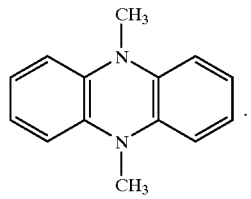

After the solution was vacuum-injected into the empty cell, the injection port was sealed with an epoxy sealant thereby obtaining an electrochromic mirror as shown in FIG. 3.

When the resulting EC mirror was viewed, the spacers were hardly perceived.

The EC mirror when assembled was not colored and had a reflectance of about 70%. The EC mirror was quick in response to the application of an electric voltage and exhibited excellent electrochromic properties. The EC mirror was colored upon application of a voltage of 1.3 V and the reflectance reached about 7% in three seconds. While the mirror was driven, the spacers are hardly perceived.

Example 2

An epoxy sealant in which glass beads with a particle diameter of about 53 to 63 μm were kneaded was applied in the form of lines along the peripheral edges of the conductive layer surface of an ITO substrate of 10 Ω/sq. having on the opposite surface an aluminum reflection layer and a protective layer laminated thereover, with a dispenser. The spacers with a particle diameter of about 53 to 63 μm and a refraction index of 1.436 obtained in Synthesis 2 were spread over the conductive surface of the resulting reflective electrically conductive substrate. A transparent glass substrate coated with ITO of 10 Ω/sq. was superposed over the reflective substrate such that their ITO surfaces face each other and then the epoxy sealant was cured with pressurizing thereby forming a hallow cell with an injection port. The cell gap of the resulting cell was about 54 μm. At this point, the spacers were fully perceived.

To a mixed solution of 1.0 g of methoxypolyethylene glycol monomethacrylate (the number of oxyethylene unit: 4) manufactured by SHIN NAKAMURA CHEMICAL CO. LTD. under the trade name of M40GN, 0.02 g of polyethylene glycol dimethacrylate (the number of oxyethylene unit: 4) manufactured by SHIN NAKAMURA CHEMICAL CO. LTD. under the trade name of 4G, 4.0 g of propylene carbonate, 0.02 g of 2,4,6-trimethylbenzoyldiphenylphosphine oxide, and 0.03 g of 2-(5-methyl-2-hydroxyphenyl)benzotriazole manufactured by CIBA-GEIGY under the trade name of TINUVIN P were added tetrafluoroboric acid tetrabutylammonium and a compound represented by the formula below such that their concentrations are made 0.5 M and 100 mM, respectively thereby obtaining a homogeneous solution (Solution A) with a refraction index of 1.44:

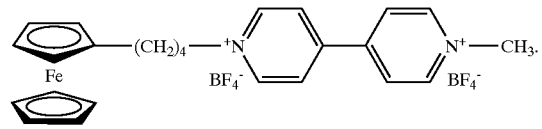

After the solution was vacuum-injected into the empty cell, the inlet was sealed with an epoxy sealant. The solution in the cell was cured by exposing the transparent substrate side of the cell to fluorescent light thereby obtaining an electrochromic mirror with the structure shown in FIG. 4.

The refraction index of the ion conductive layer obtained by curing Solution A was 1.440.

When the resulting EC mirror was viewed, the spacers were hardly perceived.

The EC mirror when assembled was not colored and had a reflectance of about 70%. The EC mirror was quick in response to the application of an electric voltage and exhibited excellent electrochromic properties. The EC mirror was colored upon application of a voltage of 1.3 V and the reflectance reached about 8% in about three seconds. While the mirror was driven, the spacers are hardly perceived.

Comparative Example 1

An electrochromic mirror was produced with the same procedures as those in Example 2 except using glass spacers with an average particle diameter of 60 μm and a refraction index of 1.52.

The spacers in this mirror were fully perceived and visually bothersome.

APPLICABILITY IN THE INDUSTRY

The EC mirror of the present invention even containing spacers in its ion conductive layer does not bother the driver and can maintain a constant cell gap. Therefore, the substrates to be used can be thinned, resulting in a lower weight EC mirror.

What is claimed is:

1. An electrochromic mirror in which an ion conductive layer is arranged between a transparent electrically conductive substrate and a reflective electrically conductive substrate; wherein the ion conductive layer contains an organic compound having a structure exhibiting a cathodic electrochromic property and a structure exhibiting an anodic electrochromic property, and wherein the organic compound comprises a metallocene-bipyridine derivative represented by one of formulas (4) to (7):

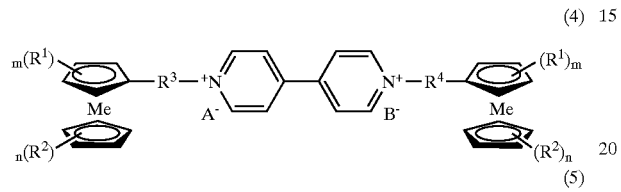
(4)

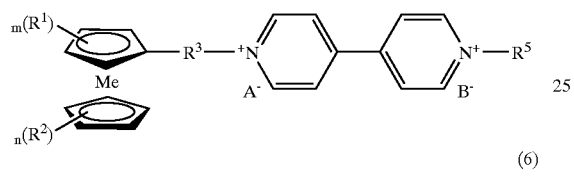
(5)

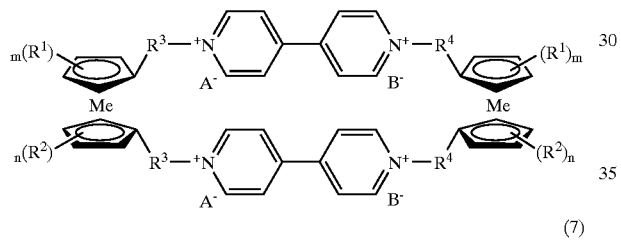
(6)

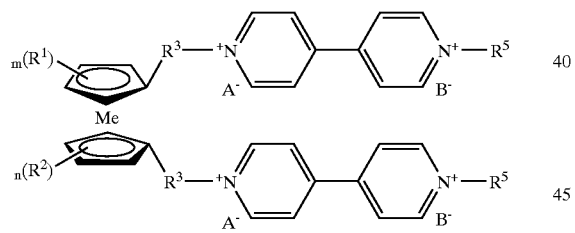
(7)

wherein $A^-$ and $B^-$ may be the same or different and are each independently a pair-ion selected from the group consisting of a halogen anion, $ClO_4^-$, $BF_4^-$ $PF_6^-$, $CHCOO^-$, and $CH_3(C_6H_4)SO_3$;

Me is selected from the group consisting of Cr, Co, Fe, Mg, Ni, Os, Ru, V, X—Hf—Y, X—Mo—Y, X—Nb—Y, X—Ti—Y, X—V—Y and X—Zr—Y, wherein X and Y may be the same or different and are each independently selected from the group consisting of hydrogen, a halogen, and an alkyl group having 1 to 12 carbon atoms;

m is an integer $0 \leq m \leq 4$;

n is an integer $0 \leq n \leq 4$;

$R^1$ and $R^2$ may be the same or different and are each independently a hydrocarbon group selected from the group consisting of alkyl, alkenyl, and aryl groups having 1 to 10 carbon atoms;

$R^3$ and $R^4$ may be the same or different and are each independently a hydrocarbon residue having 1 to 20 carbon atoms; and $R^5$ is a hydrocarbon group selected from the group consisting of alkyl, cycloalkyl, alkenyl, aryl, and aralkyl groups having 1 to 20 carbon atoms, heterocyclic aromatic groups having 4 to 20 carbon atoms, and substituted hydrocarbon or heterocyclic aromatic groups obtained by substituting at least one hydrogen of the hydrocarbon group or heterocyclic aromatic group with a substituent group;

and wherein spacers are dispersed in the ion conductive layer and a difference in refraction index between the spacers and the ion conductive layer is ±0.03 or less.

2. The electrochromic mirror according to claim 1, wherein said spacers are in a form of beads, pellets or belts.

* * * * *